United States Patent
MacPherson et al.

(10) Patent No.: US 9,996,609 B2
(45) Date of Patent: Jun. 12, 2018

(54) DATA SPREADING ON CHARTS

(71) Applicant: International Business Machines Corporation, Armonk, NY (US)

(72) Inventors: Trevor T. MacPherson, St. Andrews West (CA); Xiaowei Steven Zhong, Nepean (CA)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 14/308,673

(22) Filed: Jun. 18, 2014

(65) Prior Publication Data

US 2015/0169736 A1 Jun. 18, 2015

Related U.S. Application Data

(63) Continuation of application No. 14/109,385, filed on Dec. 17, 2013.

(51) Int. Cl.
| | |
|---|---|
| G06F 3/14 | (2006.01) |
| G06F 17/30 | (2006.01) |
| H04L 12/24 | (2006.01) |
| G06Q 10/10 | (2012.01) |
| G06F 3/0484 | (2013.01) |

(52) U.S. Cl.
CPC .... G06F 17/30651 (2013.01); G06F 3/04842 (2013.01); G06F 17/30557 (2013.01); G06Q 10/10 (2013.01); H04L 41/22 (2013.01)

(58) Field of Classification Search
CPC ..................................... G06F 3/14; G06F 3/17
USPC .................. 715/739, 771; 370/252; 707/724
See application file for complete search history.

(56) References Cited

U.S. PATENT DOCUMENTS

| | | | |
|---|---|---|---|
| 6,003,036 A * | 12/1999 | Martin | ............. G06F 17/30592 |
| 8,321,781 B2 | 11/2012 | Tolle | |
| 8,396,880 B2 | 3/2013 | Williamson | |
| 2007/0260625 A1 | 11/2007 | Tien et al. | |
| 2008/0082908 A1 | 4/2008 | MacGregor | |
| 2008/0184130 A1 | 7/2008 | Tien et al. | |
| 2009/0018996 A1 | 1/2009 | Hunt et al. | |

(Continued)

OTHER PUBLICATIONS

Office Action from U.S. Appl. No. 14/109,385, dated Sep. 16, 2015, 15 pp.

(Continued)

*Primary Examiner* — Ruay Ho
(74) *Attorney, Agent, or Firm* — Shumaker & Sieffert, P.A.

(57) ABSTRACT

Techniques are described for spreading the data into statistically meaningful visualizations and generating reports. A method comprising providing a graphical user interface displaying a data chart and a plurality of available options for data spreading models, receiving a first user input via the graphical user interface selecting one or more data elements of the data chart, receiving a second user input via the graphical user interface selecting a data spreading model from among the plurality of available options for data spreading models, generating a revised data chart based on the one or more data elements of the data chart in accordance with the data spreading model, wherein the revised data chart renders the one or more data elements of the data chart in a modified representation within the chart in accordance with the data spreading model, and outputting for display the revised data chart.

8 Claims, 8 Drawing Sheets

(56) References Cited

U.S. PATENT DOCUMENTS

| | | | |
|---|---|---|---|
| 2009/0316589 A1* | 12/2009 | Shafeeu | H04L 27/364 370/252 |
| 2011/0161374 A1 | 6/2011 | Williamson | |
| 2013/0036113 A1* | 2/2013 | Damera-Venkata | 707/724 |
| 2013/0091132 A1 | 4/2013 | Khalatov et al. | |
| 2013/0111321 A1 | 5/2013 | Dorrell | |
| 2013/0159926 A1 | 6/2013 | Vainer et al. | |
| 2014/0092096 A1 | 4/2014 | Breedvelt-Schouten | |
| 2016/0140254 A1* | 5/2016 | Yan | G06F 3/0484 715/771 |

OTHER PUBLICATIONS

Final Office Action from U.S. Appl. No. 14/109,385, dated Dec. 24, 2015, 23 pp.

"Chapter 5: Using Data Spreading," IBM Cognos TM1 Users Guide, Version 9.5, IBM Corp., Copyright 2007, 2009, 32 pp.

Hill, "Neglected Functionality—TM1 Data Spreading," TM1 Tutorials.com, retrieved from http://blog.tm1tutorials.com/tag/data-spreading/, Sep. 21, 2011, 8 pp.

U.S. Appl. No. 14/109,385, filed Dec. 17, 2013 entitled "Data Spreading on Charts."

Office Action from U.S. Appl. No. 14/109,385, dated Aug. 18, 2016, 18 pp.

Response to the Office Action dated Apr. 29, 2016, from U.S. Appl. No. 14/109,385, filed Jul. 28, 2016, 12 pp.

Response to Final Office Action dated Aug. 18, 2016 from U.S. Appl. No. 14/109,385, filed Jan. 10, 2017 10 pgs.

Aendment in Response to Office Action dated Mar. 31, 2017, from U.S. Appl. No. 14/109,385, filed Jun. 29, 2017, 11 pp.

Office Action from U.S. Appl. No. 14/109,385, dated Mar. 31, 2017 16 pgs.

Final Office Action from U.S. Appl. No. 14/109,385, dated Aug. 18, 2017, 19 pp.

Amendment in Response to Office Action dated Aug. 18, 2017, from U.S. Appl. No. 14/109,385, filed Oct. 18, 2017, 12 pp.

Advisory Action from U.S. Appl. No. 14/109,385, dated Dec. 14, 2017, 5 pp.

Office Action from U.S. Appl. No. 14/109,385, dated Jan. 9, 2018, 18 pp.

Amendment in Response to Office Action dated Jan. 9, 2018, from U.S. Appl. No. 14/109,385, filed Mar. 28, 2018, 5 pp.

* cited by examiner

DATA SPREADING ON CHARTS

This application is a continuation of Ser. No. 14/109,385, filed on Dec. 17, 2013 entitled DATA SPREADING ON CHARTS, the entire content of which is incorporated herein by reference.

FIELD OF INVENTION

The disclosure relates to data representation and visualization in computing systems, including mobile devices.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligence tools, enterprise reporting tools, project and resource management systems, and other enterprise software systems.

Many enterprise performance management and business planning applications require a large base of users to enter data that the software then accumulates into higher level areas of responsibility in the organization. Often these complex systems make use of multidimensional data sources that organize and manipulate the tremendous volume of data using data structures referred to as data cubes. A data cube may, for example, include a plurality of hierarchical dimensions having levels and members for storing the multidimensional data. Once data has been entered, a user may wish to view some or all of the data in a coherent manner by generating a report. The system may perform mathematical calculations on the data, combining data submitted by many users. Using the results of these calculations, the system may generate reports for review by higher management.

Reporting and analysis end user products (typically referred to as Business Intelligence, or BI, tools) allow users to author reports and perform data exploration and analysis on a myriad of data sources, such as multi-dimensional data structures, relational databases, flat files, Extensible Markup Language ("XML") data, data streams, and unorganized text and data. Business intelligence tools may be used to prepare and aggregate individual reports and analyses by executing queries on underlying data sources, and to present those reports and analyses in a user-accessible format.

SUMMARY

Techniques are described for simplifying reports that include data spreads, such as line charts and bar charts in some examples, by spreading the data into statistically meaningful groupings and summaries.

In one example, a method for entering data with a data spreading function includes providing, by a computing device, a graphical user interface displaying a data chart and a plurality of available options for data spreading models, receiving, by the computing device, a first user input via the graphical user interface selecting one or more data elements of the data chart, receiving, by the computing device, a second user input via the graphical user interface selecting a data spreading model from among the plurality of available options for data spreading models, generating, by the computing device, a revised data chart based on the one or more data elements of the data chart in accordance with the data spreading model, wherein the revised data chart renders the one or more data elements of the data chart in a modified representation within the chart in accordance with the data spreading model, and outputting for display, by the computing device and in the graphical user interface, the revised data chart.

In another example, a system for entering data with a data spreading function includes at least one processor, wherein the at least one processor is configured to provide a graphical user interface displaying a data chart and a plurality of available options for data spreading models, a query module operable by the at least one processor to receive a first user input via the graphical user interface selecting one or more data elements of the data chart, receive a second user input via the graphical user interface selecting a data spreading model from among the plurality of available options for data spreading models, a data spreading module operable by the at least one processor to generate a revised data chart based on the one or more data elements of the data chart in accordance with the data spreading model, wherein the revised data chart renders the one or more data elements of the data chart in a modified representation within the chart in accordance with the data spreading model, and the user interface module operable by the at least one processor to output the revised data chart for display.

In another example, a computer program product for entering data with a data spreading function includes a computer-readable storage medium having program code embodied therewith, the program code executable by at least one processor to provide a graphical user interface displaying a data chart and a plurality of available options for data spreading models, a query module operable by the at least one processor to receive a first user input via the graphical user interface selecting one or more data elements of the data chart, receive a second user input via the graphical user interface selecting a data spreading model from among the plurality of available options for data spreading models, a data spreading module operable by the at least one processor to generate a revised data chart based on the one or more data elements of the data chart in accordance with the data spreading model, wherein the revised data chart renders the one or more data elements of the data chart in a modified representation within the chart in accordance with the data spreading model, and the user interface module operable by the at least one processor to output the revised data chart for display.

The details of one or more examples are set forth in the accompanying drawings and the description below. Other features will be apparent from the description and drawings, and from the claims.

DETAILED DESCRIPTION

Data spreading is a powerful mechanism for bulk data entry in sparse Online Analytical Processing (OLAP) data applications. It affords users a means of quickly writing data based on a number of known and prescribed forecast or input methods. For example, the forecast or input methods include proportion for non-null consolidations, equal values, straight line linear interpolation, and relative proportion to contain tuple impact to relevant co-ordinates based on an alternate member axis.

The techniques of the present disclosure may, for example, provide hardware, firmware, software, or some combination thereof operable to spread the data while minimizing the need for user interaction. That is, techniques may enable a computing device or computing system to create and display reports of data spread visualizations in a way that allows users to more easily understand and consume the data while ensuring minimal user input.

Figure 1:
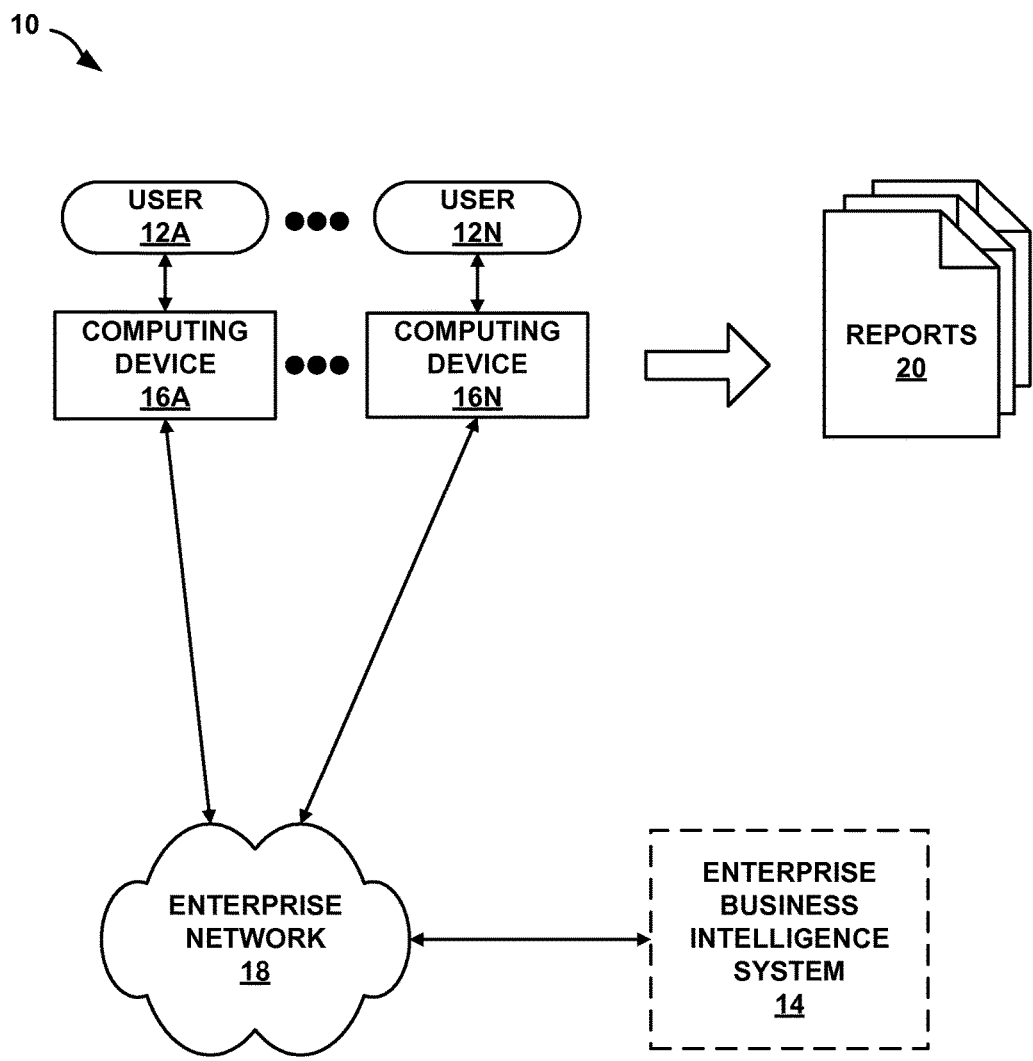
FIG. 1 is a block diagram illustrating an example computing environment in which a plurality of users interact with an enterprise business intelligence system, in accordance with one or more aspects of the present disclosure.

FIG. 1 is a block diagram illustrating an example computing environment in which a plurality of users interact with an enterprise business intelligence system, in accordance with one or more aspects of the present disclosure. Specifically, FIG. 1 is a block diagram illustrating an example of computing environment 10 in which a plurality of users 12A-12N (collectively "users 12") may interact with an enterprise business intelligence system 14, in accordance with one or more aspects of the present disclosure. As shown in the example computing environment 10 of FIG. 1, enterprise business intelligence system 14 may be communicatively coupled to a number of computing devices 16A-16N (collectively "computing devices 16") by an enterprise network 18. Users 12 interact with their respective computing devices to access enterprise business intelligence system 14 and input, modify, and review data. In one example, users 12 may use computing devices 16 to access enterprise business intelligence system 14 and author one or more reports 20. Reports 20 may include business intelligence reports, such as sales reports, revenue reports, payroll reports, etc. Enterprise business intelligence system 14 may provide users 12 with functionality to create reports 20 including visualizations of hierarchical data. Users 12, computing devices 16A-16N, enterprise network 18, and enterprise business intelligence system 14 may all be either in a single facility or widely dispersed in two or more separate locations anywhere in the world, in different examples.

For exemplary purposes, various examples of the techniques of this disclosure may be readily applied to various software systems executed by various devices, including enterprise business intelligence systems, other large-scale enterprise software systems, as well as single-user, stand-alone software applications. Examples of enterprise software systems include enterprise financial or budget planning systems, order management systems, inventory management systems, sales force management systems, business intelligence tools, enterprise reporting tools, project and resource management systems, and other enterprise software systems. Other example applications include spreadsheet applications, tax assessment software, or any environment where visualization of hierarchical data may be beneficial. For instance, techniques of this disclosure may be readily applied by user interfaces for viewing personal or business finances.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, a system, apparatus, or device used to store data, but does not include a computer readable signal medium. Such system, apparatus, or device may be of a type that includes, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the example of FIG. 1, typically, users 12 may use a user-configurable business intelligence user interface (UI) to view and manipulate data (e.g., generate reports 20) via their respective computing devices 16. This may include data from any of a wide variety of sources, including from multidimensional data structures and relational databases within enterprise 4, as well as data from a variety of external sources that may be accessible over a public network. Multidimensional data structures are "multidimensional" in that each multidimensional data element is defined by a plurality of different object types, where each object is associated with a different dimension. In some examples, users 12 may, for example, retrieve data related to store sales by entering a name of a sales person, a store identifier, a date, a product, and a price at which the product was sold, into their respective computing devices 16.

Enterprise users 12 may use a variety of different types of computing devices 16 to run business intelligence UI and to generate business intelligence reports 20 or otherwise interact with enterprise business intelligence system 14 via enterprise network 18. For example, enterprise user 12 may run a business intelligence UI and interact with enterprise business intelligence system 14 using a laptop computer, desktop computer, or the like, running a web browser. Alternatively, an enterprise user may use a smartphone or similar device, running a business intelligence UI in either a web browser or a dedicated mobile application for interacting with enterprise business intelligence system 14. Further examples of computing devices 16 may include workstation computers, netbooks, tablet computers, E-readers, or any other such computing device. In either case, a business intelligence UI running on a user's computing device 16 may access various data sources from within enterprise business intelligence system 14, as well as any of a variety of external network resources and any of a variety of external data sources.

Enterprise network 18 may represent any communication network, such as a packet-based digital network like a private enterprise intranet or a public network like the Internet. In this manner, enterprise network 18 can readily scale to suit large enterprises. Enterprise users 12 may directly access enterprise business intelligence system 14 via a local area network, or may remotely access enterprise business intelligence system 14 via a virtual private network, remote dial-up, or similar remote access communication mechanism.

In some examples, the business intelligence UI running on computing devices 16 may use retrieved data to generate one or more reports 20 using the techniques described herein. In other examples, enterprise business intelligence system 14 may generate reports 20 and provide reports 20 to one or more of computing devices 16. That is, in some examples, techniques of the present disclosure may be performed by one or more devices or systems external to computing devices 16. Computing devices 16 may send indications of input to the remote devices, which perform techniques of the present disclosure, and receive data (e.g., reports 20) from the remote devices. In any case, one of users 12 (e.g., user 12A) may interact with one of computing devices 16 (e.g., computing device 16A) to generate one or more of reports 20. Computing device 16A may receive input indicating the data to include in the report. For instance, user 12A may indicate a range of data elements and/or the dimensions to include in the report. Computing device 16A may access enterprise business intelligence system 14 or other sources to obtain the specified data.

In some examples, the specified data may be hierarchical data. Hierarchical data may include one or more measures associated with one or more dimensions that are organized in a hierarchy. That is, data elements may be labeled using various hierarchical dimensions. Data elements in one dimension may be based on a collection of data elements in other dimensions. For instance, revenue data elements may be labeled using a "state" dimension, a "county" dimension, and a "city" dimension. The state, county, and city dimensions may be defined in a hierarchy, such that each city is contained within a county and each county is contained within a state. Thus, the revenue values in the county dimension may each be a grouping of revenue values in the city dimension and revenue values in the state dimension may each be a grouping of revenue values in the county dimension. That is, in hierarchical data, data elements in a higher dimension may be a sum of data elements in a lower dimension, an average value of data elements in a lower dimension, a minimum or maximum data element in a lower dimension, or otherwise dependent upon data elements in a lower dimension.

Various types of visualizations may be used in reports 20 to depict data spreads. For instance, the data may be shown in a line chart (e.g., FIGS. 5A & 5B) or a bar chart (FIGS. 7A & 7B), to name only a few examples. As one example, each line of the line chart may correspond to a measure of cost or revenue as described in reference to FIGS. 5A & 5B.

In addition, techniques of the present disclosure may enable a computing device to generate one or more of reports 20 that include one or more data spreads. For instance, the computing device may output information to display the data spread as a data spread visualization. In some examples, the computing device may output the data spread visualization as part of a graphical user interface (GUI) for viewing and interacting with the displayed data. That is, computing devices or computing systems operating in accordance with techniques described herein may generate reports 20 that users 12 may change, modify or add to by providing input.

By spreading data and outputting the data spread for display, techniques of the present disclosure may enable a computing device to provide insightful information to users while easing information recognition and understanding. That is, displaying a data spread (e.g., in a line chart or bar chart) may enable users to quickly gain an understanding of important information while avoiding "information overload" from cluttered and/or confusing visualizations.

In one example of a method for entering data with a data spreading function, the method comprising providing, by a computing device, a graphical user interface displaying a data chart and a plurality of available options for data spreading models, receiving, by the computing device, a first user input via the graphical user interface selecting one or more data elements of the data chart, receiving, by the computing device, a second user input via the graphical user interface selecting a data spreading model from among the plurality of available options for data spreading models, generating, by the computing device, a revised data chart based on the one or more data elements of the data chart in accordance with the data spreading model, wherein the revised data chart renders the one or more data elements of the data chart in a modified representation within the chart in accordance with the data spreading model, and outputting for display, by the computing device and in the graphical user interface, the revised data chart.

In other examples of the method, wherein the plurality of available options for data spreading models comprises one of more of a relative proportional spreading model, an equal spreading model, a gross percentage spreading model, a straight line spreading model, and a growth spreading model. In some examples of the method, wherein the revised data chart comprises a first revised data chart, the method further comprising receiving, by the computing device, a third user input via the graphical user interface selecting one or more data elements of the first revised data chart, generating, by the computing device, a second revised data chart based on the one or more data elements of the first revised data chart in accordance with the data spreading model, wherein the second revised data chart renders the one or more data elements of the first revised data chart in a modified representation in accordance with the data spreading model, and outputting for display, by the computing device and in the graphical user interface, the second revised data chart. Additionally, in some examples, wherein the revised data chart comprises a first revised data chart, wherein the data spreading model comprises a first data spreading model, and wherein the method further comprises receiving, by the computing device, a third user input via the graphical user interface selecting one or more data elements of the first revised data chart, receiving, by the computing device, a fourth user input via the graphical user interface selecting a second data spreading model from among the plurality of available options for data spreading models, generating, by the computing device, a second revised data chart based on the one or more data elements of the first revised data chart in accordance with the second data spreading model, wherein the second revised data chart renders the one or more data elements of the first revised data chart in a modified representation in accordance with the second data spreading model, and outputting for display, by the computing device and in the graphical user interface, the second revised data chart. Moreover, in other examples, wherein each of the first user input and the second user input comprise user input received at one or more of a presence sensitive device and a keyboard. In some examples, wherein the data chart is an OLAP data chart, and wherein the revised data chart is a revised OLAP data chart. Additionally, in some examples the method further includes storing, by the computing device, the data spreading model as a preferred data spreading model for future reuse by a particular user, and storing, by the computing device, one or more preferred parameters identified by the particular use and associated with the preferred data spreading model. In yet other examples, wherein receiving the second user input via the graphical user interface selecting the data spreading model further comprises receiving the second user input to select a representation of the data chart in the graphical user interface to apply to a second location in the graphical user interface at which the revised data chart is displayed.

Figure 2A:
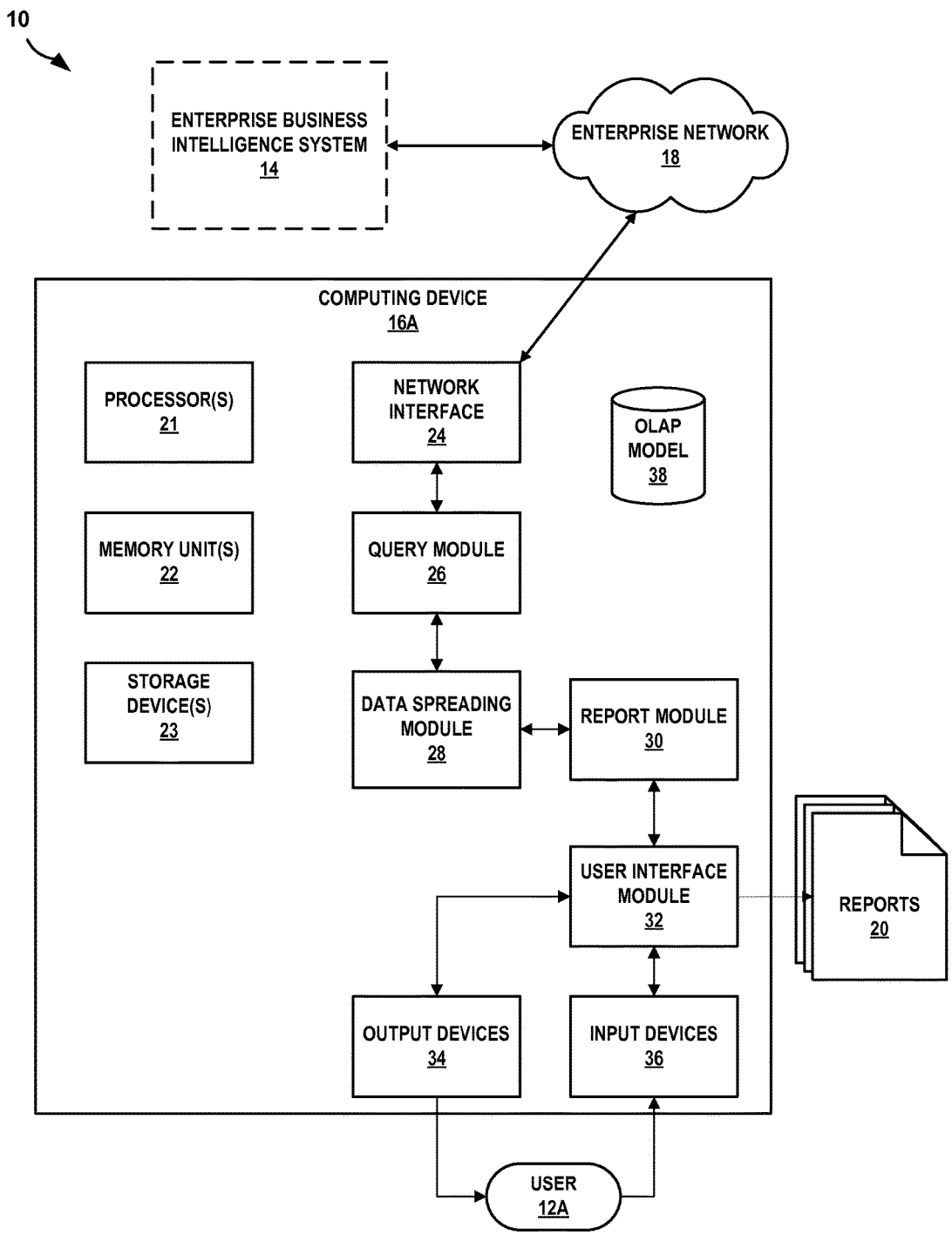
FIG. 2A is a block diagram illustrating one example of a computing device that may be used for interacting with the enterprise business intelligence system of FIG. 1, in accordance with one or more aspects of the present disclosure.
Figure 2B:
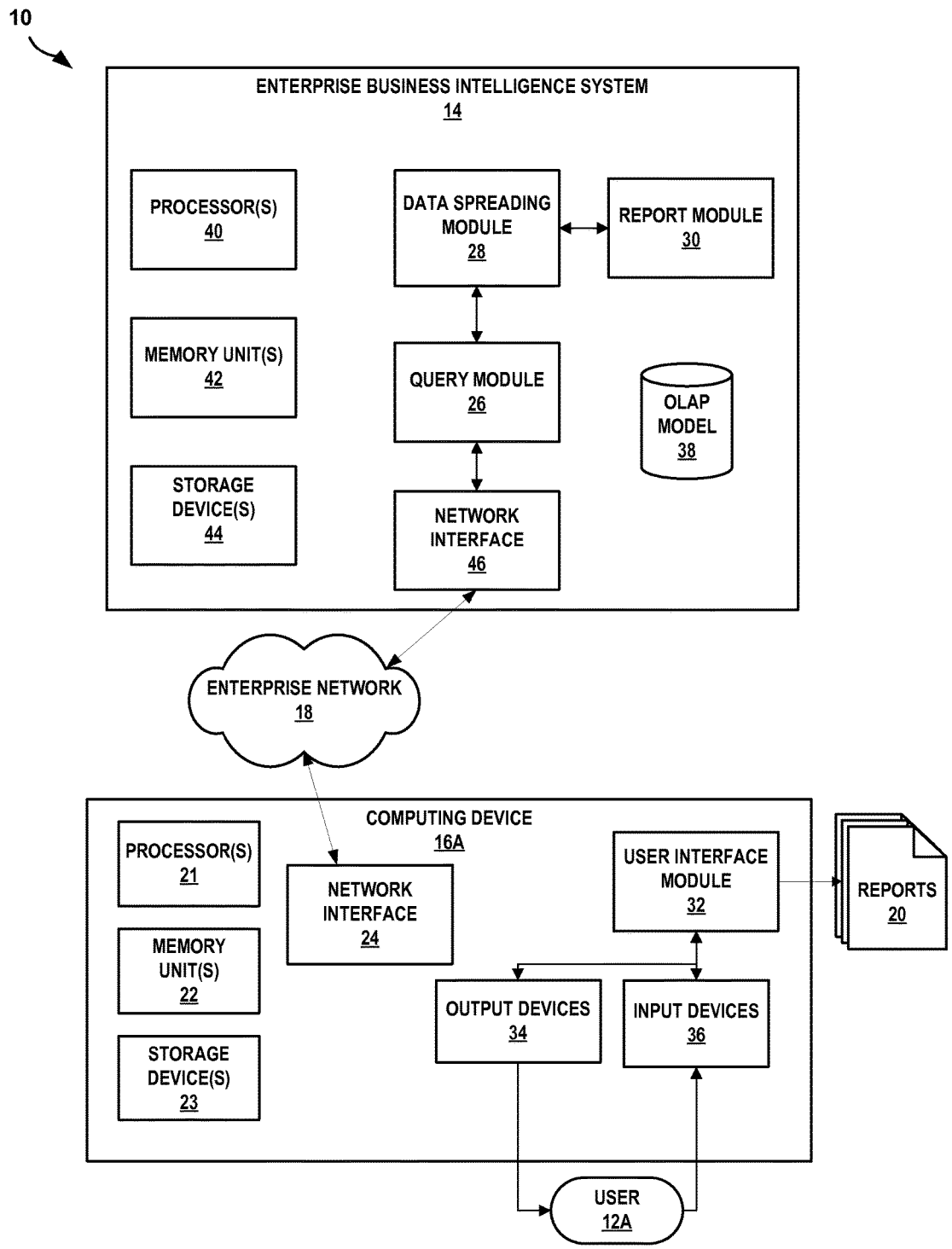
FIG. 2B is a block diagram illustrating another example of a computing device that may be used for interacting with the enterprise business intelligence system of FIG. 1, in accordance with one or more aspects of the present disclosure.

FIGS. 2A & 2B are a block diagrams illustrating examples of a computing device that may be used for interacting with the enterprise business intelligence system of FIG. 1, in accordance with one or more aspects of the present disclosure. As shown in accordance with the example computing environment 10 of FIG. 1, enterprise business intelligence system 14 may be communicatively coupled to a number of computing devices 16A-16N (collectively "computing devices 16") by an enterprise network 18.

In FIG. 2A, computing device 16A includes one or more processors 21, one or more memory units 22, and one or more storage devices 23. In addition, computing device 16A includes network interface 24, query module 26, data spreading module 28, report module 30, user interface (UI) module 32, one or more output devices 34, and one or more input devices 36. While shown as separate components in FIG. 2, operations performed by one or more of network interface 24, modules 26, 28, 30, and 32, and/or devices 34 and 36 may be performed by a single module or device, or other number of modules or devices in various examples, such as FIG. 2B. Additionally, in some examples, one or more components of computing device 16A, such as query module 26, data spreading module 28, and/or report module 30, may be part of enterprise business intelligence system 14 or other device connected to enterprise network 18. That is, in some examples, techniques of the present disclosure may be performed by various devices of enterprise business intelligence system 14 and computing device 16A may communicate with one or more other devices via enterprise network 18 to send requests for data and/or receive generated output.

Computing device 16A, in the example of FIG. 2A, includes one or more processors 21. Processors 21, in one example, are configured to implement functionality and/or process instructions for execution in computing device 16A. For example, processors 21 may be capable of executing instructions of various components of computing device 16A, such as modules 26, 28, 30 and 32. Examples of processors 21 may include, any one or more of a microprocessor, a controller, a digital signal processor (DSP), an application specific integrated circuit (ASIC), a field-programmable gate array (FPGA), or equivalent discrete or integrated logic circuitry.

In the example of FIG. 2A, computing device 16A includes one or more memory units 22. Memory units 22 may be configured to store information in computing device 16A during operation. Memory units 22, in some examples, are a temporary memory, meaning that a primary purpose of memory units 22 is not long-term storage. In other examples, memory units 22 include one or more computer-readable storage media. Memory units 22, in some examples, are described as volatile memory, meaning that memory units 22 do not maintain stored contents when the computer is turned off. Examples of volatile memories include random access memories (RAM), dynamic random access memories (DRAM), static random access memories (SRAM), and other forms of volatile memories known in the art. In some examples, memory units 22 are used to store program instructions for execution by processors 21. Memory units 22, in one example, are used by software or applications running on computing device 16A (e.g., modules 26, 28, 30, and/or 32) to temporarily store information during program execution.

Computing device 16A, as shown in FIG. 2A, includes one or more storage devices 23. In some examples, storage devices 23 include one or more computer-readable storage media. Storage devices 23 may be configured to store larger amounts of information than volatile memory. Storage devices 23 may further be configured for long-term storage of information. In some examples, storage devices 23 include non-volatile storage elements. Examples of non-volatile storage elements include magnetic hard discs, optical discs, floppy discs, flash memories, or forms of electrically programmable memories (EPROM) or electrically erasable and programmable memories (EEPROM). While shown as separate components in FIG. 2A, memory units 22 may be one example of storage devices 23.

In some examples, memory units 22 and/or storage devices 23 may store or otherwise include one or more data cubes. Data cubes may store data from user 12A and/or from data sources of enterprise business intelligence system 14 via enterprise network 18. Data stored in the data cubes may provide the underlying data for computing device 16A to generate data spreads and/or create reports 20. Data cubes, in some examples, may include two-dimensional databases and/or multidimensional databases (e.g., cubes). Data cubes may be implemented using a variety of vendor platforms, and may be distributed throughout the enterprise via network interface 24. As one example, the data cubes may be multidimensional databases configured for OLAP. As another example, the data cubes may be multidimensional databases configured to receive and execute MDX queries of some arbitrary level of complexity. As yet another example, the data cubes may be two-dimensional relational databases configured to receive and execute SQL queries, also with an arbitrary level of complexity. Storing the data cubes locally within memory units 22 and/or storage devices 23 may allow some or all calculation performed as part of condensing hierarchical data and generating reports 20 to be performed locally by computing device 16A. In other examples, computing device 16A may not store the data cubes locally, and one or more devices, such as enterprise business intelligence system 14 may perform the calculation.

As shown in the example of FIG. 2A, computing device 16A includes UI module 32. UI module 32 may include instructions operable by processors 21 via memory units 22 to interact with output devices 34 and/or input devices 36 to provide an interface to user 12A enabling selection of various data elements from the multidimensional enterprise data and/or creation of one or more reports 20. That is, UI module 32 may display a GUI (e.g., at one or more of output devices 34) with which user 12A can interact (e.g., by using one or more of input devices 36) to cause computing device 16A to create or select report specifications, retrieve the requisite enterprise data, and/or generate reports 20. In some examples, UI module 32 can use any GUI and charting development kit (e.g., Eclipse SWT, Web 2.0 browser scripts programming, Charting SDK).

UI module 32 may receive input from user 12A via one or more input devices 36. Input devices 36 may be part of computing device 16A, or may be communicatively coupled to computing device 16A. Input devices 36 may include a keyboard, a mouse, a touch-sensitive or presence-sensitive display, a stylus, or any device operable to provide machine input. UI module 32 may output information to user 12A via one or more of output devices 34. While shown in the example of FIG. 2A as part of computing device 16A, output devices 34 may, in other examples, be external to and/or operatively coupled to computing device 16A. Output devices 34, in some examples, are configured to provide output to a user using tactile, audio, or video stimuli. Output devices 34 may include a presence-sensitive display, a sound card, a video graphics adapter card, or any other type of device for converting a signal into an appropriate form understandable to humans or machines. Additional examples of output devices 34 include a speaker, a cathode ray tube (CRT) monitor, a liquid crystal display (LCD), or any other type of device that can generate intelligible output to a user.

In the example of FIG. 2A, UI module 32 may receive input from user 12A (e.g., via input devices 36) indicating a request to generate one or more reports 20 for display (e.g., at output devices 34). UI module 32 may provide the request to one or more other components of computing device 16A.

As shown in the example of FIG. 2A, computing device 16A includes report module 30. Report module 30 may include instructions operable by processors 20 via memory units 22 to generate reports 20 based on report specifications. Report specifications may be one or more documents used by computing device 16A (e.g., stored on storage devices 23) that provide the structure and content of reports 20. In some examples, report specifications may include documents or files containing markup language (e.g., XML) instructions that define various criteria for a report. That is, report specifications may be configurations of data (e.g., input data) to be included in a report. For instance, a report specification may define the type and layout of various objects (e.g., charts and tables) to be displayed in a report. Report specifications may include one or more definitions that specify which data element or elements are to be included or used to generate the objects of reports 20. The definitions may be created in a query language, (e.g., SQL), and may be executable by components of computing device 16A to cause retrieval of the defined data elements from underlying data sources.

In the example of FIG. 2A, report module 30 may receive the inputted request from UI module 32. The request may include an indication of a report specification to use in order to generate one of reports 20. The request may also include an indication of the underlying data to include in the report. That is, data received from UI module 32 may specify the format of a report as well as the data to include in the report. In the example of FIG. 2A, report module 30 may receive a request to generate a report that includes a data spread visualization of particular sales data from enterprise business intelligence system 14. For instance, the request may indicate that the data spread visualization should include revenue data for a particular range of sales areas. Responsive to receiving the data, report module 30 may cause one or more other components of computing device 16A to retrieve the relevant enterprise data.

Computing device 16A, in the example of FIG. 2A, includes query module 26. Query module 26 may include instructions operable by processors 21 via memory units 22 to generate queries used to obtain data from enterprise business intelligence system 14 via enterprise network 18. For instance, query module 26 may receive an indication (e.g., from report module 30 or other components) of specific data elements to be retrieved from within multidimensional data of enterprise business intelligence system 14. In some examples, query module 26 may generate one or more queries to retrieve relevant data from locally stored data cubes. In yet other examples, query module 26 may obtain the relevant data from a combination of sources.

Computing device 16A, in the example of FIG. 2A, includes network interface 24. Network interface 24 may provide functionality to communicate with external devices, such as enterprise business intelligence system 14, via one or more networks (e.g., enterprise network 18). Network interface 24 may include a network interface card, such as an Ethernet card, an optical transceiver, a radio frequency transceiver, or any other type of device that can send and receive information. Other examples of such network interfaces may include 3G and WiFi radio components, as well as Universal Serial Bus (USB). In some examples, computing device 16A utilizes network interface 24 to communicate with enterprise business intelligence system 14 when sending or receiving multidimensional data, such as when retrieving data for reports 20. In the example of FIG. 2A, query module 26 may communicate with network interface 24 and cause network interface 24 to send one or more queries to enterprise business intelligence system 14 in order to obtain the relevant information (e.g., revenue and sales volume information). Responsive to sending the queries, network interface 24 may receive enterprise data (e.g., data specified by the queries) via enterprise network 18. Network interface 24 may provide the received data to query module 26. Query module 26 may send the data received from network interface 24 to one or more other components of computing device 16A.

As shown in the example of FIG. 2A, computing device 16A includes data spreading module 28. Data spreading module 28 (e.g., lower level data spreading APIs) may be operable by processors 21 via memory units 22 to receive enterprise data, determine a data spread of the enterprise data based on one or more user inputs selecting by user 12A the data spreading models, change the data representation to obtain an original data spread, and/or output the original data spread to report module 30 for display as part of reports 20.

In this way, data spreading module 28 may enable computing device 16A to display enterprise data spread according to one or more data spreading models that is potentially more easily understood and absorbed by users.

Figure 7A:
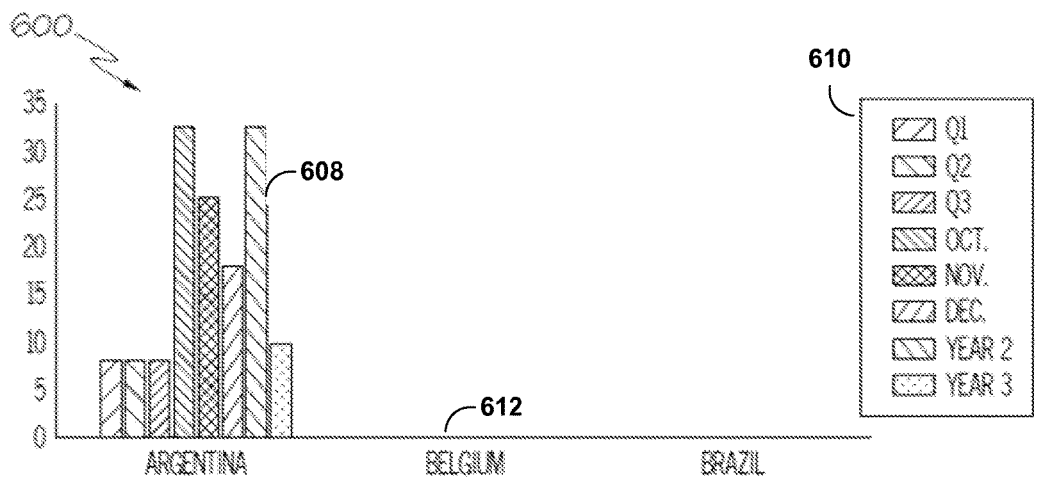
FIGS. 7A and 7B are conceptual diagrams illustrating another example of a GUI displaying data spreading visualization, in accordance with one or more aspects of the present disclosure.
Figure 7B:
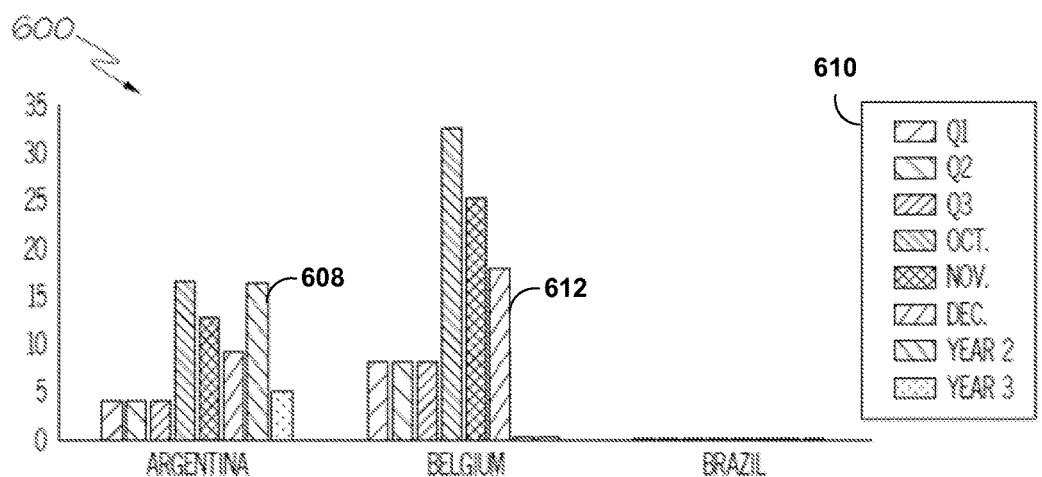

In some examples, in order to spread data, data spreading module 28 may create a data spreading model (e.g., a custom data spreading model) to spread the data. In the example of FIG. 7B, for instance, data spreading module 28 may use a data spreading model based on the data spreading model of a previous data spread, such as reference "Argentina," which used the relative proportional spreading model. In other examples, enterprise data may already be in a data spread. That is, in some examples, data received from query module 26 may have been stored from a previous data spread.

Data spreading module 28 may perform operations on the original data spread to change the original data spread once a data spreading criterion is encountered. A data spreading criterion, in various examples, represents an indication that the user has selected a different data spreading model. In some examples, the data spreading criterion may be defined by the user, or contained within the report specification for a given report. In other examples, data spreading module 28 may use a predefined data spreading criterion, or may automatically determine the data spreading criterion (e.g., based on the data to be spread). Once data spreading module 28 encounters a data spreading criterion, data spreading module 28 may output the second data spread to one or more other components of computing device 16A (e.g., report module 30).

Report module 30 may receive the original data spread from data spreading module 28 and generate reports 20. Report module 30 may generate one or more of reports 20 based on the report specification received as part of the request. In the example of FIG. 2A, report module 30 outputs reports 20 locally at computing device 16A. That is, report module 30 may send data to UI module 32 causing UI module 32 to display reports 20 at one or more of output devices 34. In other examples, report module 30 may output reports 20 to enterprise business intelligence system 14, or to others of computing devices 16 via network interface 24.

In another example of computing device 16A, the computing device comprises at least one processor, wherein the at least one processor is configured to provide a graphical user interface displaying a data chart and a plurality of available options for data spreading models, a query module operable by the at least one processor to receive a first user input via the graphical user interface selecting one or more data elements of the data chart, receive a second user input via the graphical user interface selecting a data spreading model from among the plurality of available options for data spreading models, a data spreading module operable by the at least one processor to generate a revised data chart based on the one or more data elements of the data chart in accordance with the data spreading model, wherein the revised data chart renders the one or more data elements of the data chart in a modified representation within the chart in accordance with the data spreading model, and the user interface module operable by the at least one processor to output the revised data chart for display.

In some examples of computing device 16A, wherein the plurality of available options for data spreading models comprises one of more of a relative proportional spreading model, an equal spreading model, a gross percentage spreading model, a straight line spreading model, and a growth spreading model. In other examples of the computing device 16A, wherein the revised data chart comprises a first revised data chart, and wherein the at least one processor is further configured to receive a third user input via the graphical user interface selecting one or more data elements of the first revised data chart, generate a second revised data chart based on the one or more data elements of the first revised data chart in accordance with the data spreading model, wherein the second revised data chart renders the one or more data elements of the first revised data chart in a modified representation in accordance with the data spreading model, and outputting for display, in the graphical user interface, the second revised data chart. Additionally, in other examples of computing device 16A, wherein the revised data chart comprises a first revised data chart, wherein the data spreading model comprises a first data spreading model, and wherein the at least one processor is further configured to receive a third user input via the graphical user interface selecting one or more data elements of the first revised data chart, receive a fourth user input via the graphical user interface selecting a second data spreading model from among the plurality of available options for data spreading models, generate a second revised data chart based on the one or more data elements of the first revised data chart in accordance with the second data spreading model, wherein the second revised data chart renders the one or more data elements of the first revised data chart in a modified representation in accordance with the second data spreading model, and output for display, in the graphical user interface, the second revised data chart. Moreover, in some examples, computing device 16A may further include one or more of a presence sensitive device and a keyboard, wherein each of the first user input and the second user input comprise user input received at the one or more of the presence sensitive device and the keyboard. In other examples of computing device 16A, wherein the data chart is an OLAP data chart, and wherein the revised data chart is a revised OLAP data chart. In yet other examples of computing device 16A, wherein the at least one processor is further configured to store the data spreading model as a preferred data spreading model for future reuse by a particular user, and store one or more preferred parameters identified by the particular use and associated with the preferred data spreading model. In some examples of computing device 16A, wherein the at least one processor is configured to receive the second user input via the graphical user interface selecting the data spreading model at least by receiving the second user input to select a representation of a data chart in the graphical user interface to apply to a second location in the graphical user interface at which the revised data chart is displayed.

FIG. 2B illustrates another example of a computing device that may be used for interacting with the enterprise business intelligence system of FIG. 1, in accordance with one or more aspects of the present disclosure. FIG. 2B is an example substantially similar to FIG. 2A, and elements with the same reference numerals in FIG. 2B function similarly to those corresponding elements as described in FIG. 2A.

In FIG. 2B, computing device 16A includes one or more processors 21, one or more memory units 22, and one or more storage devices 23. In addition, computing device 16A includes network interface 24, query module 26, data spreading module 28, report module 30, user interface (UI) module 32, one or more output devices 34, and one or more input devices 36. While shown as separate components, operations performed by one or more of network interface 24, modules 26, 28, 30, and 32, and/or devices 34 and 36 may be performed by a single module or device, or other number of modules or devices in various examples.

For example, in FIG. 2B enterprise business intelligence system 14 includes one or more processors 40, one or more memory units 42, and one or more storage devices 44. In addition, enterprise business intelligence system 14 includes network interface 46, query module 26, data spreading module 28, report module 30, and OLAP model 38.

Enterprise business intelligence system 14, in the example of FIG. 2B, includes one or more processors 40. Processors 40, in one example, are configured to implement functionality and/or process instructions for execution in enterprise business intelligence system 14. For example, processors 40 may be capable of executing instructions of various components of enterprise business intelligence system 14, such as modules 26, 28, 30. Examples of processors 40 may include, any one or more of a microprocessor, a controller, a digital signal processor (DSP), an application specific integrated circuit (ASIC), a field-programmable gate array (FPGA), or equivalent discrete or integrated logic circuitry.

In the example of FIG. 2B, enterprise business intelligence system 14 includes one or more memory units 42. Memory units 42 may be configured to store information in enterprise business intelligence system 14 during operation. Memory units 42, in some examples, are a temporary memory, meaning that a primary purpose of memory units 42 is not long-term storage. In other examples, memory units 42 include one or more computer-readable storage media. Memory units 42, in some examples, are described as volatile memory, meaning that memory units 42 do not maintain stored contents when the computer is turned off. Examples of volatile memories include random access memories (RAM), dynamic random access memories (DRAM), static random access memories (SRAM), and other forms of volatile memories known in the art. In some examples, memory units 42 are used to store program instructions for execution by processors 21. Memory units 42, in one example, are used by software or applications running on enterprise business intelligence system 14 (e.g., modules 26, 28, and 30) to temporarily store information during program execution.

Enterprise business intelligence system 14, as shown in FIG. 2B, includes one or more storage devices 44. In some examples, storage devices 44 include one or more computer-readable storage media. Storage devices 44 may be configured to store larger amounts of information than volatile memory. Storage devices 44 may further be configured for long-term storage of information. In some examples, storage devices 44 include non-volatile storage elements. Examples of non-volatile storage elements include magnetic hard discs, optical discs, floppy discs, flash memories, or forms of electrically programmable memories (EPROM) or electrically erasable and programmable memories (EEPROM). While shown as separate components in FIG. 2B, memory units 42 may be one example of storage devices 44.

In some examples, memory units 42 and/or storage devices 44 may store or otherwise include one or more data cubes. Data cubes may store data from user 12A and/or from data sources of enterprise business intelligence system 14 via enterprise network 18. Data stored in the data cubes may provide the underlying data for enterprise business intelligence system 14 to generate data spreads and/or create reports 20. Data cubes, in some examples, may include two-dimensional databases and/or multidimensional databases (e.g., cubes). Data cubes may be implemented using a variety of vendor platforms, and may be distributed throughout the enterprise via network interface 46. As one example, the data cubes may be multidimensional databases configured for OLAP 38. As another example, the data cubes may be multidimensional databases configured to receive and execute MDX queries of some arbitrary level of complexity. As yet another example, the data cubes may be two-dimensional relational databases configured to receive and execute SQL queries, also with an arbitrary level of complexity. Storing the data cubes remotely within memory units 42 and/or storage devices 44 may allow some or all calculation performed as part of spreading data and generating reports 20 to be performed remotely by enterprise business intelligence system 14.

As shown in the example of FIG. 2B, enterprise business intelligence system 14 includes report module 30. Report module 30 may include instructions operable by processors 40 via memory units 42 to generate reports 20 based on report specifications. Report specifications may be one or more documents used by enterprise business intelligence system 14 (e.g., stored on storage devices 44) that provide the structure and content of reports 20. In some examples, report specifications may include documents or files containing markup language (e.g., XML) instructions that define various criteria for a report. That is, report specifications may be configurations of data (e.g., input data) to be included in a report. For instance, a report specification may define the type and layout of various objects (e.g., charts and tables) to be displayed in a report. Report specifications may include one or more definitions that specify which data element or elements are to be included or used to generate the objects of reports 20. The definitions may be created in a query language, (e.g., SQL), and may be executable by components of enterprise business intelligence system 14 to cause retrieval of the defined data elements from underlying data sources.

In the example of FIG. 2B, report module 30 may receive the inputted request from UI module 32 of computing device 16A through enterprise network 18. The request may include an indication of a report specification to use in order to generate one of reports 20. The request may also include an indication of the underlying data to include in the report. That is, data received from UI module 32 may specify the format of a report as well as the data to include in the report. In the example of FIG. 2B, report module 30 may receive a request to generate a report that includes a data spread visualization of particular sales data from enterprise business intelligence system 14. For instance, the request may indicate that the data spread visualization should include revenue data for a particular range of sales areas. Responsive to receiving the data, report module 30 may cause one or more other components of enterprise business intelligence system 14 to retrieve the relevant enterprise data.

Enterprise business intelligence system 14, in the example of FIG. 2B, includes query module 26. Query module 26 may include instructions operable by processors 40 via memory units 42 to generate queries used to obtain data from enterprise business intelligence system 14. For instance, query module 26 may receive an indication (e.g., from report module 30 or other components) of specific data elements to be retrieved from within multidimensional data of enterprise business intelligence system 14. In some examples, query module 26 may generate one or more queries to retrieve relevant data from locally stored data cubes. In yet other examples, query module 26 may obtain the relevant data from a combination of sources.

Enterprise business intelligence system 14, in the example of FIG. 2B, includes network interface 46. Network interface 46 may provide functionality to communicate with external devices, such as computing device 16A, via one or more networks (e.g., enterprise network 18). Network interface 46 may include a network interface card, such as an Ethernet card, an optical transceiver, a radio frequency transceiver, or any other type of device that can send and receive information. Other examples of such network interfaces may include 3G and WiFi radio components, as well as Universal Serial Bus (USB). In some examples, enterprise business intelligence system 14 utilizes network interface 46 to communicate with computing device 16A when sending or receiving multidimensional data, such as when retrieving data for reports 20. In the example of FIG. 2B, query module 26 may communicate with network interface 46 and cause network interface 46 to send one or more queries to computing device 16A in order to obtain the relevant information, such as revenue and sales volume information. Responsive to sending the queries, network interface 46 may receive enterprise data (e.g., data specified by the queries) via enterprise network 18. Network interface 46 may provide the received data to query module 26. Query module 26 may send the data received from network interface 24 to one or more other components of enterprise business intelligence system 14.

As shown in the example of FIG. 2B, enterprise business intelligence system 14 includes data spreading module 28. Data spreading module 28 may be operable by processors 40 via memory units 42 to receive enterprise data, determine a data spread of the enterprise data based on one or more data spreading models, change the data representation to obtain an original data spread, and/or output the original data spread to report module 30 for display as part of reports 20. In this way, data spreading module 28 may enable enterprise business intelligence system 14 to display enterprise data spread according to one or more data spreading models that is potentially more easily understood and absorbed by users.

Data spreading module 28 may perform operations on the original data spread to change the original data spread once a data spreading criterion is encountered. A data spreading criterion, in various examples, represents an indication that the user has selected a different data spreading model. In some examples, the data spreading criterion may be defined by the user, or contained within the report specification for a given report. In other examples, data spreading module 28 may use a predefined data spreading criterion, or may automatically determine the data spreading criterion (e.g., based on the data to be spread). Once data spreading module 28 encounters a data spreading criterion, data spreading module 28 may output the second data spread to one or more other components of enterprise business intelligence system 14 (e.g., report module 30).

Report module 30 may receive the original data spread from data spreading module 28 and generate reports 20. Report module 30 may generate one or more of reports 20 based on the report specification received as part of the request. In the example of FIG. 2B, report module 30 outputs reports 20 remotely at computing device 16A. That is, report module 28 may output reports 20 to enterprise business intelligence system 14, or to others of computing devices 16 via network interface 46.

Figure 3:
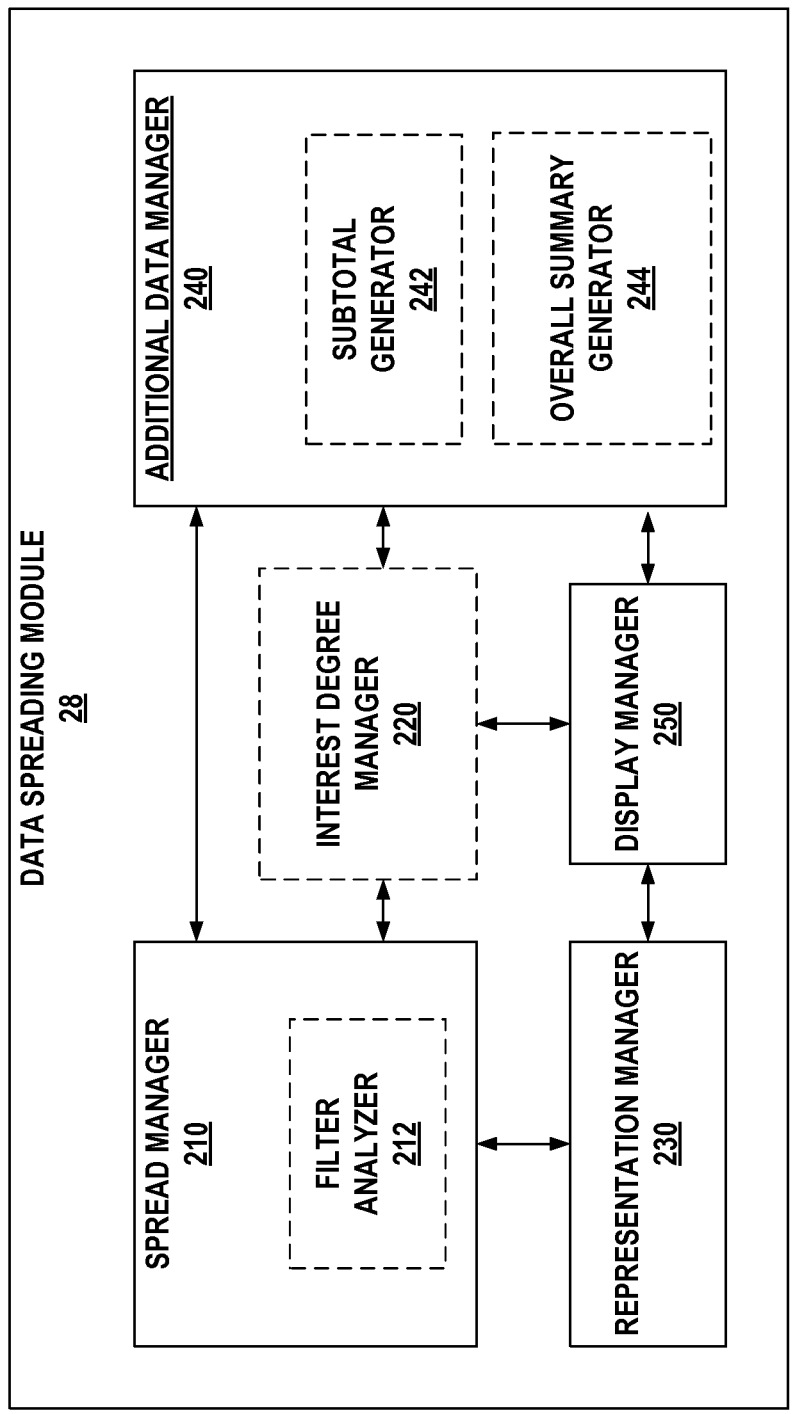
FIG. 3 is a block diagram illustrating an example of a data spreading module, in accordance with one or more aspects of the present disclosure.

FIG. 3 is a block diagram illustrating an example of a data spreading module, in accordance with one or more aspects of the present disclosure. Data spreading module 28 includes spread manager 210, representation manager 230, additional data manager 240 and display manager 250. In some examples, data spreading module 28 may further include interest degree manager 220.

Spread manager 210 spreads data of the set of interest into a series of discrete data spreads. Spread manager 210 may, in some examples, have filter analyzer 212 to identify one or more filters applied to the set by the user, such as user 12A, and spreads the set of data based on the filters. In various examples, filtering is the primary mechanism by which data is spread. There are various types of filters: by measure value, by data label (caption), by attribute value, by excluding data, and by using filter functions, such as the top(n), top(sum) and top(percent), to name a few non-limiting examples. User 12A may use a filter to specify some data to be displayed, and another filter to specify some data to be included in a report but not displayed.

Interest degree manager 220 determines an interest degree of each data spread. Interest degree manager 220 determines a data spread containing data specified by the filters as a data spread of greater interest, and a data spread containing data filtered out by the filters as a data spread of lesser interest. In one example, the data that passes the filter criteria is the data of most interest. Additionally, there is a display limit which may govern the number of passed-filter data that are shown. The displayed data can be based on their natural order as returned from the data source, a sorted order (ascending, descending), or their position in the result of the filter expression. A data spread containing those non-displayed data that pass the filter criteria and specified to be not displayed is considered as a data spread of lesser interest than a data spread containing those displayed members, but of greater interest than a data spread containing those members that do not pass the filter criteria.

Representation manager 230 generates a summarized representation of each data spread of lesser interest. Representation manager 230 aggregates and/or calculates data of each data spread of lesser interest so that the data of lesser interest is represented in less detail in a report. Non-displayed data that passes the filter criteria is summarized in a remainder data spread ("More"). Data that does not pass the filter criteria may be summarized in an excluded data spread. Such a summarized representation enhances readability of the report.

Additional data manager 240 manages additional data items that describe relevant data. Additional data manager 240 may, in some examples, have a subtotal generator 242 and an overall summary generator 244. Subtotal generator 242 aggregates a measure of the data in the data spread of greater interest and generates a subtotal. Overall summary generator 244 generates an overall summary or aggregation of all the data in the set of interest. These additional data items describe the data to augment the user experience in analyzing the report.

Display manager 250 presents a report with data of each data spread of greater interest and the summarized representation of each data spread of lesser interest. Display manager 250 explicitly presents measure values of the data of data spreads of greater interest to provide a higher amount of detail to the user.

In addition to displaying the data spreads, display manager 250 may also display additional data items that describe the data, such as a subtotal of each data spread of greater interest, and the overall summary of all the data in the set. If there are any calculations individually defined by user 12A, display manager 250 also present those calculations.

Figure 4:
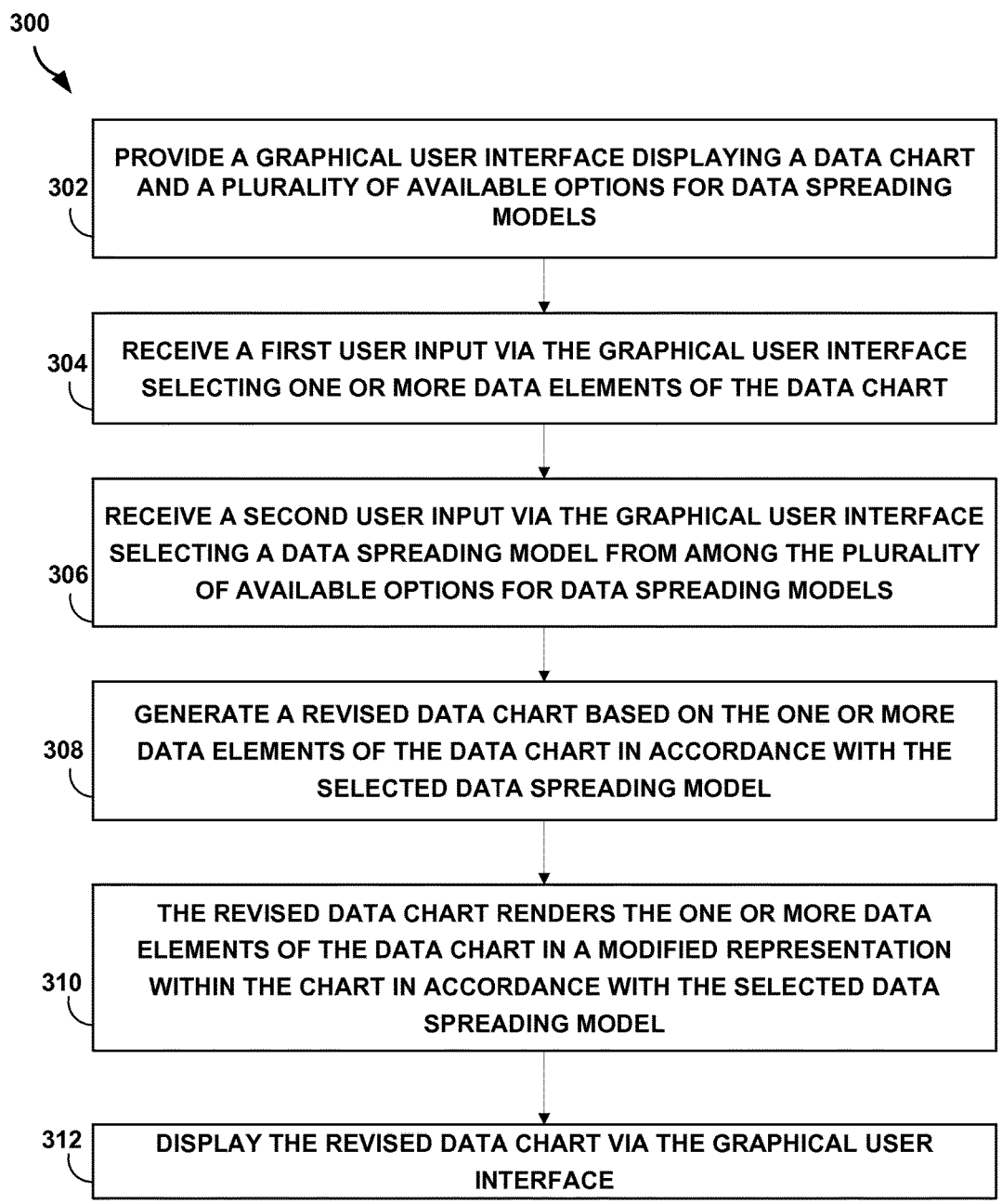
FIG. 4 is a flow chart illustrating an example of operations for using data spreading models via a graphical user interface, in accordance with one or more aspects of the present disclosure.

FIG. 4 is a flow chart illustrating an example of operations for using data spreading models via a graphical user interface, in accordance with one or more aspects of the present disclosure. For purposes of illustration only, operations 300 of FIG. 4 are described as being performed by one or more of the components shown in FIGS. 2A and 2B.

Figure 5A:
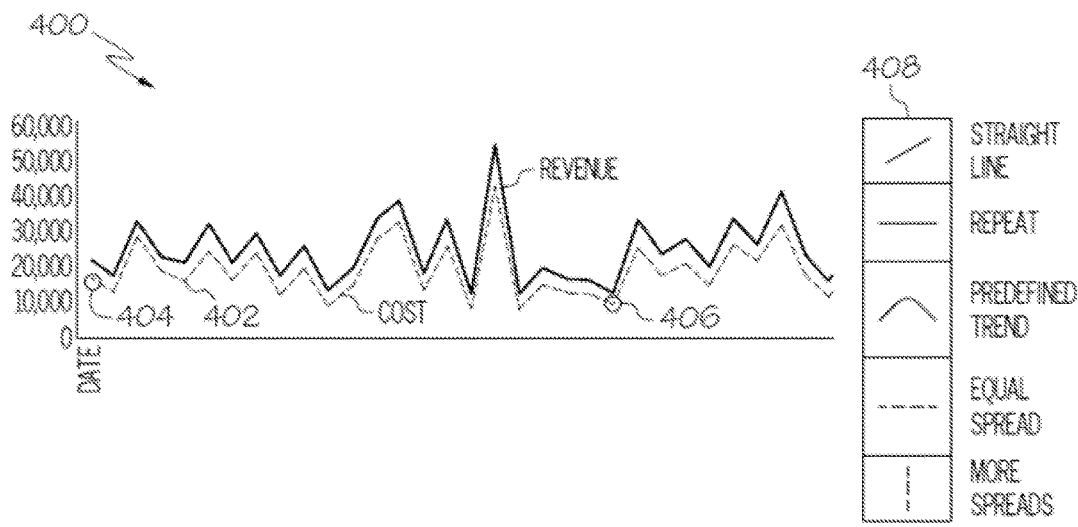
FIGS. 5A and 5B are conceptual diagrams illustrating one example of a GUI displaying data spreading visualization, in accordance with one or more aspects of the present disclosure.
Figure 5B:
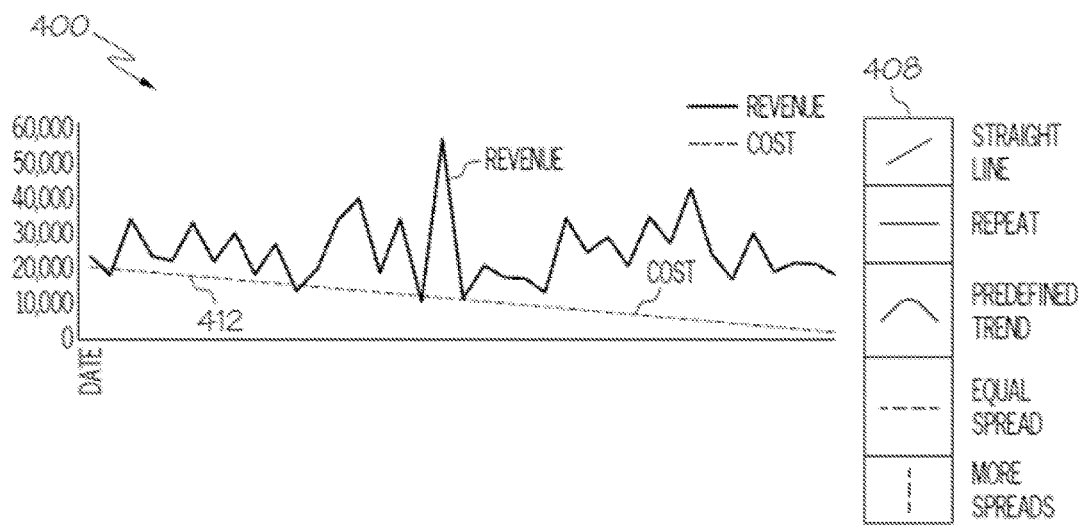

Computing device 16A or enterprise business intelligence system 14 may use user interface module 32 to provide a GUI displaying a data chart (e.g., GUI 400 as shown in FIG. 5A) and a plurality of available options for data spreading models (e.g., criterion selector 408 as shown in FIG. 5A) (302). Computing device 16A or enterprise business intelligence system 14 may use query module 26 to retrieve data from memory units 22, storage devices 23, or enterprise business intelligence system 14. Computing device 16A or enterprise business intelligence system 14 may receive a first user input from user 12A on input devices 36 and/or output devices 34 through a GUI generated by user interface module 32 to select one or more data elements (e.g., values 404, 406 using the value selector as described in FIGS. 5A & 5B) of the data chart (e.g. cost line chart 402 as described in FIG. 5A) (304). Computing device 16A or enterprise business intelligence system 14 may receive a second user input from user 12A on input devices 36 and/or output devices 34 through a GUI generated by user interface module 32 to select a data spreading model from among the plurality of available options for data spreading models (e.g., criterion selector 408 as shown in FIG. 5A) (306). Computing device 16A or enterprise business intelligence system 14 generates a revised data chart, using data spreading module 28, based on the selected one or more data elements of the data chart in accordance with the selected data spreading model (308). The revised data chart renders the one or more data elements (e.g., values 404, 406 using the value selector as described in FIGS. 5A & 5B) of the data chart (e.g. cost line chart 402 as described in FIG. 5A) in a modified representation (e.g., cost line chart 412 as shown in FIG. 5B) in accordance with the selected data spreading model (e.g., straight line data spreading) (310). Computing device 16A or enterprise business intelligence system 14 displays the revised data chart on output devices 36 via the GUI (e.g., GUI 400 as shown in FIGS. 5A & 5B, GUI 600 as shown in FIGS. 6A & 6B) provided by user interface module 32 (312).

In some examples of operations, the plurality of available options for data spreading models comprises one of more of a relative proportional spreading model, an equal spreading model, a gross percentage spreading model, a straight line spreading model, and a growth spreading model. In other examples of operations, the program code is further executable by the at least one processor to receive a third user input via the graphical user interface selecting one or more data elements of the first revised data chart, generate a second revised data chart based on the one or more data elements of the first revised data chart in accordance with the data spreading model, wherein the second revised data chart renders the one or more data elements of the first revised data chart in a modified representation in accordance with the data spreading model, and output for display, in the graphical user interface, the second revised data chart. Additionally, in other examples of operations, the program code is further executable by the at least one processor to receive a third user input via the graphical user interface selecting one or more data elements of the first revised data chart, receive a fourth user input via the graphical user interface selecting a second data spreading model from among the plurality of available options for data spreading models, generate a second revised data chart based on the one or more data elements of the first revised data chart in accordance with the second data spreading model, wherein the second revised data chart renders the one or more data elements of the first revised data chart in a modified representation in accordance with the second data spreading model, and output for display, in the graphical user interface, the second revised data chart. In some examples of operations, the computer program product may further include an input devices module, wherein each of the first user input and the second user input comprise user input received at the input devices module, and wherein the input devices module includes input from a keyboard and a presence sensitive device. In other examples of operations, wherein the data chart is an OLAP data chart, and wherein the revised data chart is a revised OLAP data chart. In yet other examples of operations, wherein the program code is further executable by the at least one processor to store the data spreading model as a preferred data spreading model for future reuse by a particular user, and store one or more preferred parameters identified by the particular use and associated with the preferred data spreading model. Additionally, in some examples of operation, wherein the program code is further executable by the at least one processor to receive the second user input via the graphical user interface selecting the data spreading model at least by receiving the second user input to select a representation of a data chart in the graphical user interface to apply to a second location in the graphical user interface at which the revised data chart is displayed.

FIGS. 5A and 5B are conceptual diagrams illustrating one example of a GUI displaying data spreading visualization 412, in accordance with one or more aspects of the present disclosure. Graphical user interface (GUI) may be displayed by UI module 32 at one or more of output devices 34 of computing device 16A in either of the examples as described in FIGS. 2A and 2B. As shown in the example of FIGS. 5A and 5B, GUI 400 includes data spreading visualization 412.

Data spreading visualization may be a visualization of a data spreading module outputted by data spreading module 32. One or more components of computing device 16A may have received a request for one of reports 20 and retrieved the data specified in the request from enterprise business intelligence system 14 and/or storage devices 44. The retrieved data, such as line 402, in the example of FIGS. 5A and 5B, may include two dimensions of cost data, corresponding to amount associated with the cost values, and dates associated with the cost values.

Data spreading module 28 may receive the data, and determine (e.g., based on the way the data is defined) that the retrieved data is cost. In accordance with the techniques of the present disclosure, data spreading module 28 may spread the cost to according to a selected data spreading model. That is, data spreading module 28 may create a data spread (e.g. an original data spread) from the retrieved data.

In accordance with one or more techniques of the present disclosure, data spreading module 28 may change the original data spread. The change in the original data spread may be controlled by a second data spreading model to create a second data spread. The second data spreading model can be selected from the UI 32.

After changing the original data spread, data spreading module 28 may output the second data spread to report module 30. Report module 30 may generate a report including data spreading visualization based on the second data spread and send the report to UI module 32 for display. UI module 32 may, in turn, cause one or more of output devices 34 to display a GUI including a second data spreading visualization.

In some examples, reports 20, displayed as part of a GUI, may be static. That is, the report may be displayed at output devices 34 for viewing by user 12A and, if user 12A desires to change an attribute of the report, user 12A may provide input (e.g., via input devices 36) to cause computing device 16A to generate a new report. In other examples, reports 20 may be interactive. For instance, user 12A may view reports 20 at one of output devices 34, and use one or more of input devices 36 to interact with the report. In some examples, computing device 16A may allow users to interact with a report by changing parameters used in change the underlying data spread (e.g., change the data spread model used, change the type or value of an input parameter, or otherwise modify the report). In the example of FIGS. 5A and 5B, GUI 400 may display line chart 402 as part of an interactive report. As such, GUI 400 includes value slider, such as points 404, 406 and criterion selector 408, to manipulate the retrieved data and generate an original data spread. In the example of FIGS. 5A and 5B, the user interacts with GUI 400 and selects values 404, 406 from line 402 representing cost over a period of time, and the user selects a straight-line spreading model from criterion selector 408 to spread the data of line 402. As best shown in FIG. 5B, after selecting values 404, 406 and applying the straight-line spreading model from criterion selector 408, the original data spread is represented as data spread visualization 412.

In some examples, GUI 400 may also include one or more graphical elements allowing user 12A to change the data spreading model used to change the original data spread underlying the data spread visualization. That is, in various examples, computing device 16A may display elements of GUI 400 allowing users to change or modify data spreading, such as list of data spreading models 408, add or remove dimensions from the original data spread, or perform other operations to gain further insight into the displayed data.

Criterion selector 408 may enable a user to change the type of data spreading model used in spreading the retrieved data. For instance, criterion selector 408 may be a dropdown menu that shows possible types of data spreading models (e.g., straight-line, repeat, pre-defined trend, equal spread, more spreads, custom spreads, or other criterion). User 12A may select criterion selector 408 to display the menu, and select a specific type of data spreading model. Responsive to receiving user 12A's selection, computing device 16A may cause data spreading module 28 to re-spread the original data spread, using the new type of data spreading model.

Value selector 404, 406 may enable a user to change a value of the retrieved data used in spreading the original data spread. For instance, in the example of FIG. 5A, user 12A may move value selector 404, 406 to the left or to the right to increase or decrease a value such as the range of dates. In other examples, moving value selector 404, 406 up or down may increase or decrease the value of cost.

Figure 6:
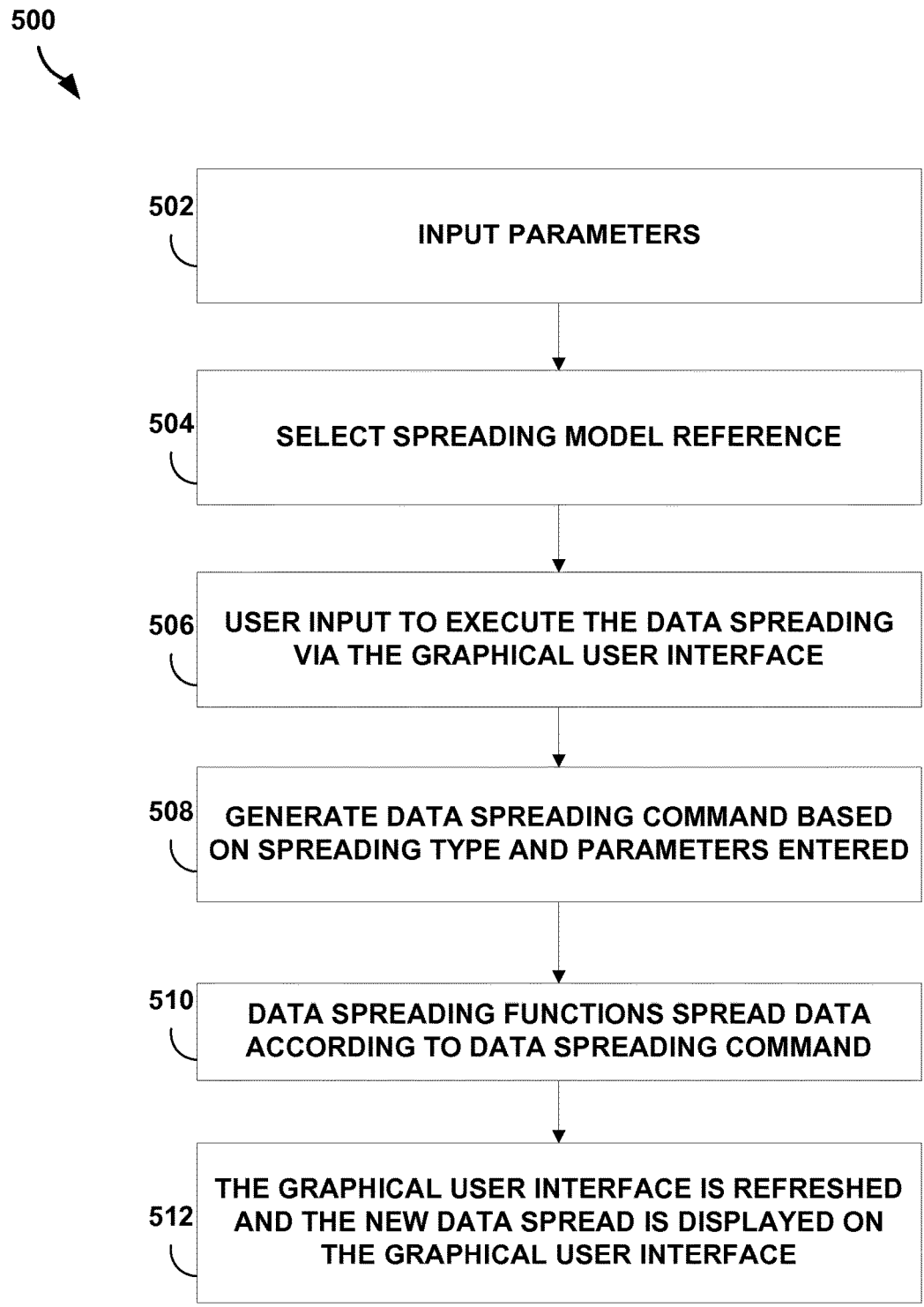
FIG. 6 is a flowchart illustrating an example of operations for using data spreading models via a graphical user interface, in accordance with one or more aspects of the present disclosure.

FIG. 6 is a flowchart illustrating an example of operations for using data spreading models via a graphical user interface, in accordance with one or more aspects of the present disclosure. For purposes of illustration only, operations 500 of FIG. 6 are described as being performed by one or more of the components shown in FIGS. 2A and 2B.

Computing device 16A may use query module 26 to retrieve data from memory units 22, storage devices 23, or enterprise business intelligence system 14. Upon retrieving relevant information, computing device 16A receives a user input from user 12A on input devices 36 and/or output devices 34 through a GUI generated by user interface module 32, for example, a user input on an unpopulated chart on the GUI to input spread parameters, such as total value to spread (502). Computing device 16A also receives a user input from user 12A on input devices 36 and/or output devices 34 through a GUI generated by user interface module 32 to select a spreading model reference, such as a spreading model reference (e.g., a previously spread bar chart 608, such as "Argentina" as shown in FIG. 7A) or a data spreading model (e.g., straight-line, repeat, pre-defined trend, equal spread, or relative proportional spread) from a criterion selector, such as criterion selector 408 as shown in FIGS. 5A & 5B (504). After computing device 16A receives the selection for either the spreading model reference 608 as shown in FIG. 7A or the data spreading model from the criterion selector 408 as shown in FIGS. 5A & 5B, computing device 16A receives a user input from user 12A on input devices 36 and/or output devices 34 through a GUI generated by user interface module 32 (e.g., mouse click, input to a touchscreen, or "enter" on keyboard) to execute the data spreading visualization via the GUI (506). Upon computing device 16A executing the data spreading visualization, computing device 16A using data spreading module 28 generates data spreading command based on selected spreading model and parameters entered (508). After generating the data spreading command, data spreading module 28 uses data spreading functions (e.g., TM1Backend Data Spreading, low level data spreading APIs) to spread the retrieved data from memory units 22, storage devices 23, and/or enterprise business intelligence system 14 according to the generated data spreading command to generate using report module 30 one or more reports 20 (510). The GUI, such as GUI 600 as shown in FIG. 7A is refreshed and the new data spread (e.g. "Belgium" bar chart 612) in report 20 is displayed on the GUI (e.g., GUI 600 as shown in FIG. 7B) (512).

FIGS. 7A and 7B are conceptual diagrams illustrating another example of a GUI displaying data spreading visualization, in accordance with one or more aspects of the present disclosure. Graphical user interface (GUI) may be displayed by UI module 32 at one or more of output devices 34 of computing device 16A as described in either FIGS. 2A and 2B. As shown in the example of FIGS. 7A and 7B, GUI 600 includes data spreading visualization 612.

Data spreading visualization may be a visualization of a data spreading module outputted by data spreading module 32. One or more components of computing device 16A may have received a request for one of reports 20 and retrieved the data specified in the request from enterprise business intelligence system 14 and/or storage devices 44. The retrieved data, in the example of FIGS. 7A and 7B, may include two or more dimensions of revenue data, corresponding to geographical locations associated with the revenue values, such as quarters, months, and/or years. Specifically, the retrieved data may correspond to revenue values in different countries (e.g., Argentina, Belgium, and/or Brazil), for three quarters (e.g., Quarter 1, Quarter 2, and Quarter 3), three months (e.g., October, November, and December), and two years (e.g., Year 2 and Year 3), as shown in legend 610 in FIGS. 7A and 7B.

Data spreading module 28 may receive the data, and determine (e.g., based on the way the data is defined) that the retrieved data is revenue. In accordance with the techniques of the present disclosure, data spreading module 28 may spread the revenue to according to a selected data spreading model. That is, data spreading module 28 may create a data spread (e.g. an original data spread) from the retrieved data.

In accordance with one or more techniques of the present disclosure, data spreading module 28 may change the original data spread. The change in the original data spread may be controlled by a second data spreading model to create a second data spread. The second data spreading model can be selected from the UI 32.

After changing the original data spread, data spreading module 28 may output the second data spread to report module 30. Report module 30 may generate a report including data spreading visualization based on the second data spread and send the report to UI module 32 for display. UI module 32 may, in turn, cause one or more of output devices 34 to display a GUI including a second data spreading visualization.

In some examples, reports 20, displayed as part of a GUI, may be static. That is, the report may be displayed at output devices 34 for viewing by user 12A and, if user 12A desires to change an attribute of the report, user 12A may provide input (e.g., via input devices 36) to cause computing device 16A to generate a new report. In other examples, reports 20 may be interactive. For instance, user 12A may view reports 20 at one of output devices 34, and use one or more of input devices 36 to interact with the report. In some examples, computing device 16A may allow users to interact with a report by changing parameters used in change the underlying data spread (e.g., change the data spread model used, change the type or value of an input parameter, or otherwise modify the report). In the example of FIGS. 7A and 7B, GUI 600 may display bar chart 608 as part of an interactive report. As such, GUI 600 includes a criterion selector, not shown in FIGS. 7A and 7B, and a value selector not shown in FIGS. 7A and 7B. In the example of FIGS. 7A and 7B GUI 600 may display bar chart 602 as part of an interactive report. As such, GUI 600 includes criterion selector and value input, to manipulate the retrieved data and generate a data spread. In the example of FIGS. 7A and 7B, the user interacts with GUI 600 and selects a new bar chart for data spreading, such as Belgium 612, to input a total value to spread. After inputting the total value to spread, the user interacts with GUI 600 and selects either a data spreading model from the criterion selector or a reference model, such as Argentina bar chart 608 representing cost over a period of time spread by the relative proportional spread. As best shown in FIG. 7B, after inputting 200 as the total value to spread, and selecting Argentina bar chart 608 as a reference for relative proportional spreading, the original data spread for Belgium is represented as data spread visualization 612.

In some examples, GUI 600 may also include one or more graphical elements allowing user 12A to change the data spreading model used to change the original data spread underlying the data spread visualization. That is, in various examples, computing device 16A may display elements of a GUI allowing users to change or modify data spreading, add or remove dimensions from the original data spread, or perform other operations to gain further insight into the displayed data.

Criterion selector may enable a user to change the type of data spreading model used in spreading the retrieved data. For instance, the criterion selector may be a dropdown menu that shows possible types of data spreading models (e.g., straight-line, repeat, pre-defined trend, equal spread, relative proportional spread, more spreads, custom spreads, or other criterion). User 12A may select the criterion selector to display the menu, and select a specific type of data spreading model. Responsive to receiving user 12A's selection, computing device 16A may cause data spreading module 28 to re-spread the original data spread, using the new type of data spreading model.

Value input may enable a user to change a value or range of the retrieved data used in spreading the original data spread. For instance, in the example of FIG. 7B, user 12A may input 200 as the total value to spread.

According to the above disclosure, a user will be able to implement data spreading models using a graphical user interface on a computing device, such as a mobile device. Additionally, the user will be able to use the graphical user interface to select references, such as other charts, to assist in generating other data spread visualizations. Moreover, minimal interaction by the user will be necessary to spread data based on specific data spreading models.

In some examples, the proportion only spread model does not support a forecast for a comparable member, such as an alternate time. For example, one data set could not be spread proportionally to all geographies (visually) if known quantities for a similar data set occurred in a previous time period. In those examples, relative proportional spreading or linear interpolation is required to support a forecast, neither of which could be spread visually.

Forecasting visually may demand support for trend and growth, as well as proportion and relativity. For example, an ice cream shop that sells strawberry, chocolate, and vanilla ice cream in varying proportions (40%, 25%, 35% respectively) may view a trend with a simple line chart for total sales, and wish to apply a linear growth as a simple forecast process, but while useful for some circumstances, fails to acknowledge seasonality inherent in ice cream sales. In another example, the ice cream shop may introduce a new flavor, and after several months of sales, forecast from the existing trend, but this may not indicate the absorption of sales of existing flavors by demonstrating and adjusting proportion of products sold. A more accurate forecast may, in a particular case, use a stacked column chart to forecast that sales of a new flavor (bubblegum) will increase in a straight line, but will change the proportion of sales over time (e.g., 35%, 25%, 30%, 10% in June, 30%, 25%, 30%, 15% in July), relative to the growth change that occurred when another flavor, butterscotch was introduced. In addition, the relative proportion spread will allow the decline of the new flavor until no longer sold, as with butterscotch. In one or more examples, the present disclosure implements spreading examples from one or more data visualizations, without manual data entry (e.g., typed values).

The nature of sparse data and fixed structure OLAP models implies that every known value or potential value is described by any number of dimensions. This disclosure leverages the descriptive quality of OLAP models through powerful spread algorithms in order to provide a more accurate and intuitive forecast with a visual metaphor.

The disclosure provides some examples of an advanced data spreading approach via direct charting interaction and implementing bulk data entry by applying spreading rules via simple chart interaction. However, other examples of the advanced data spreading approach not provided by this disclosure may also be understood as an alternative of this disclosure. By employing the techniques described herein, a user is able to apply relative proportional spreading, straight line spreading, and growth spreading to charts directly. Applying spread functions directly to charts allows for a better understanding than other data visualizations, such as grids, for business decision makers to identify and monitor data patterns, and make further inferences and predictions. Moreover, useful data spreading options can be formularized, customized and saved as a spreading option for future reuse.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Various examples have been described. These and other examples are within the scope of the following claims.

The invention claimed is:

1. A method for entering data with a data spreading function, the method comprising:
   providing, by one or more processors of a computing device, a graphical user interface displaying a data chart and a plurality of available options for data spreading models;
   receiving, by the one or more processors of the computing device, a first user input via the graphical user interface selecting one or more data elements of the data chart, wherein the one or more data elements of the data chart comprises an object from a previously spread data model reference, wherein the previously spread data model reference comprises a previous data spread in the data chart;
   receiving, by the one or more processors of the computing device, a second user input via the graphical user interface selecting a data spreading model from among the plurality of available options for data spreading models, wherein the data spreading model comprises at least the previous data spread that is generated based on the data spreading model, and wherein selecting the data spreading model comprises selecting the previous data spread for generating an original data spread within the data chart;
   generating, by the one or more processors of the computing device, a revised data chart based on the one or more data elements of the data chart in accordance with the data spreading model, wherein the revised data chart renders the one or more data elements of the data chart in a modified representation within the data chart in accordance with the data spreading model, and wherein the revised data chart includes the previous data spread and the original data spread generated based on the previously spread data model reference; and
   outputting for display, by the one or more processors of the computing device and in the graphical user interface, the revised data chart.

2. The method of claim 1, wherein the plurality of available options for data spreading models comprises one of more of a relative proportional spreading model, an equal spreading model, a gross percentage spreading model, a straight line spreading model, and a growth spreading model.

3. The method of claim 1, wherein the revised data chart comprises a first revised data chart, the method further comprising:
receiving, by the one or more processors of the computing device, a third user input via the graphical user interface selecting one or more data elements of the first revised data chart;
generating, by the one or more processors of the computing device, a second revised data chart based on the one or more data elements of the first revised data chart in accordance with the data spreading model, wherein the second revised data chart renders the one or more data elements of the first revised data chart in a modified representation in accordance with the data spreading model; and
outputting for display, by the one or more processors of the computing device and in the graphical user interface, the second revised data chart.

4. The method of claim 1, wherein the revised data chart comprises a first revised data chart, wherein the data spreading model comprises a first data spreading model, and wherein the method further comprises:
receiving, by the one or more processors of the computing device, a third user input via the graphical user interface selecting one or more data elements of the first revised data chart;
receiving, by the one or more processors of the computing device, a fourth user input via the graphical user interface selecting a second data spreading model from among the plurality of available options for data spreading models;
generating, by the one or more processors of the computing device, a second revised data chart based on the one or more data elements of the first revised data chart in accordance with the second data spreading model, wherein the second revised data chart renders the one or more data elements of the first revised data chart in a modified representation in accordance with the second data spreading model; and
outputting for display, by the one or more processors of the computing device and in the graphical user interface, the second revised data chart.

5. The method of claim 1, wherein each of the first user input and the second user input comprise user input received at one or more of a presence sensitive device and a keyboard.

6. The method of claim 1, wherein the data chart is an Online Analytical Processing (OLAP) data chart, and wherein the revised data chart is a revised OLAP data chart.

7. The method of claim 1, further comprising:
storing, by the one or more processors of the computing device, the data spreading model as a preferred data spreading model for future reuse by a particular user; and
storing, by the one or more processors of the computing device, one or more preferred parameters identified by the particular use and associated with the preferred data spreading model.

8. The method of claim 1, wherein receiving the second user input via the graphical user interface selecting the data spreading model further comprises:
receiving, by the one or more processors of the computing device, the second user input to select a representation of the data chart in the graphical user interface to apply to a second location in the graphical user interface at which the revised data chart is displayed.

* * * * *